United States Patent [19]

Say

[11] Patent Number: 4,906,684

[45] Date of Patent: Mar. 6, 1990

[54] AMBIENT TEMPERATURE CURING POLYMER COMPOSITIONS CONTAINING ACETOACETOXYETHYL METHACRYLATE, GLYCIDYL METHACRYLATE AND A POLYMERIZABLE ACID

[75] Inventor: Terence E. Say, Goshen, Ky.

[73] Assignee: RTZ Chemicals, Ltd., London, United Kingdom

[21] Appl. No.: 281,652

[22] Filed: Dec. 9, 1988

[51] Int. Cl.$^4$ ............................................. C08L 33/14
[52] U.S. Cl. .................................. 524/548; 524/811; 526/318.44
[58] Field of Search ................................ 524/811, 548

[56] References Cited

U.S. PATENT DOCUMENTS

| | | | |
|---|---|---|---|
| 3,223,670 | 12/1965 | Cantor et al. | 524/811 |
| 4,408,018 | 10/1983 | Bartman et al. | 525/300 |
| 4,435,490 | 3/1984 | Lelental et al. | 430/496 |

Primary Examiner—Joseph L. Schoffer
Assistant Examiner—Jeffrey T. Smith
Attorney, Agent, or Firm—Herbert P. Price

[57] ABSTRACT

Ambient curing coating compositions are made from aqueous dispersions of copolymers of acetoacetoxyethyl acrylate or methacrylate, glycidyl arcylate or methacrylate, and ethylenically unsaturated polymerizable acid and a different monomer copolymerizable therewith.

9 Claims, No Drawings

AMBIENT TEMPERATURE CURING POLYMER COMPOSITIONS CONTAINING ACETOACETOXYETHYL METHACRYLATE, GLYCIDYL METHACRYLATE AND A POLYMERIZABLE ACID

BACKGROUND OF INVENTION

The field of art to which this invention pertains is coating compositions which cure at ambient temperatures.

Coating compositions which cure under ambient conditions have been known for a long time. The earliest of such coating compositions are coatings based on drying oils which cure by air oxidation. Other coating compositions which have been developed more recently are those based on the epoxide-carboxylic acid reaction, isocyanate-moisture reaction, polyaziridine-carboxylic acid reaction, and activated methylene-unsaturated acrylic reaction.

In U.S. Pat. No. 3,554,987, film forming interpolymers of acrylic acid, acetoacetoxyethyl methacrylate and monomers copolymerized therewith are described.

In U.S. Pat. No. 4,408,018, polymers containing pendant acetoacetate moieties are mixed with polyacrylates which contain more than one unsaturated acrylic group and are cured through Michael addition using a strong base as catalyst.

Crosslinking through Michael addition is also shown in European Patent Application No. 227,454. In this patent application, compounds containing a plurality of pendant acetoacetate groups are blended with compounds containing a plurality of ethylenically unsaturated acrylic groups and are cured with the addition of a strong base or an organometallic compound.

South African Pat. No. 85-2044 describes coating compositions curable at ambient temperatures made from a composition containing a plurality of activated methylene groups and ethylenically unsaturated carbonyl groups.

In an article by A. Noomen, entitled "Ambient Temperature Curable Coatings Based on Two-Pack Binders", Organic Coatings Conference, Athens, Greece-June, 1987, coating compositions which cure through the Michael addition reaction of acetoacetate-ketimine groups and acrylic-malonate groups are discussed.

Thermosetting coating compositions based on the epoxide-carboxylic acid reaction are disclosed in U.S. Pat. Nos. 3,305,601, and 4,028,294 and European Patent Application No. 226,171.

Due to the ever increasing demand for decorative and protective coatings which will withstand a wide variety of uses and will hold up under all kinds of environmental conditions, there is continuing research in utilizing various reactants in coating compositions.

SUMMARY OF THE INVENTION

This invention is directed to ambient curing coating compositions. In one aspect, this invention pertains to coating compositions which contain an acetoacetoxy group, a glycidyl group and a carboxylic acid group. In another aspect, this invention relates to film forming acrylic polymers which contain pendant acetoacetoxy groups, glycidyl groups, and carboxylic acid groups.

The coating compositions of this invention are comprised of an aqueous dispersion of a polymer of (a) acetoacetoxyethyl acrylate or methacrylate; (b) glycidyl acrylate or methacrylate; (c) an ethylenically unsaturated polymerizable acid and (d) a monomer copolymerizable therewith wherein (a) and (b) are present in the weight ratio of less than or equal to 0.5 or greater than 1.5, wherein (b) and (c) are present in the weight ratio of greater than 1.5, wherein the total weight percent of (a), (b) and (c) in the polymer is at least about 8 percent and not more than about 60 weight percent, wherein (d) is present in the amount of about 40 to about 92 weight percent and wherein the pH of the dispersion is about 8.5 to about 10.

When applied as a coating to a substrate, the coating cures at room temperature to a thermostat state.

DESCRIPTION OF THE INVENTION

The acetoacetoxyethyl acrylate or methacrylate monomer used in this invention can be made by the reaction of diketene with hydroxyethyl acrylate or methacrylate. The acetoacetoxyethyl group contains a methylene group between the two carbonyls and due to this position is said to be an "active" methylene group. Such groups are capable of Michael addition across double bonds and can react with epoxide groups.

The glycidyl acrylate or methacrylate monomers used in this invention are well known commercially available monomers. Such monomers can be made by the esterification of acrylic or methacrylic acid with glycidol or with epichlorohydrin followed by dehydrohalogenation. The glycidyl group is capable of reacting with active methylene groups, with carboxylic acid groups and with other epoxide groups.

Polymerizable acid monomers used in this invention are the well known mono or polycarboxylic acids which contain one polymerizable bond per molecule. Generally such acids will contain from 3 to about 24 carbon atoms and one or two carboxylic acids groups per molecule. Examples of such acids are acrylic acid, methacrylic acid, maleic acid, fumaric acid, itaconic acid, ethacrylic acid, crotonic acid, citraconic acid and half esters of the dicarboxylic acids wherein the esterified alcohol group contains from 1 to about 20 carbon atoms. Examples of suitable half esters are methyl hydrogen fumarate, benzyl hydrogen maleate, butyl hydrogen maleate, octyl hydrogen itaconate, dodecylhydrogen citraconate, and the like. The preferred acids for use in this invention are acrylic and methacrylic acid.

Copolymerizable monomers which can be used in this invention together with the three classes of monomers referred to hereinabove are any of the well known monomers which contain one ethylenically unsaturated polymerizable group per molecule and are copolymerizable with the other monomers. Examples of such monomers are acrylic and methacrylic esters wherein the ester group contains 1 to about 20 carbon atoms, e.g., methyl acrylate, methyl methacrylate, ethyl acrylate, ethyl methacrylate, isopropyl acrylate, butyl acrylate, butyl methacrylate, 2-ethylhexyl methacrylate, decyl acrylate, lauryl methacrylate, benzyl acrylate, and the like.

Other acrylic or methacrylic esters which can be used in this invention are multifunctional acrylates or methacrylates, e.g., hexanediol diacrylate. Such esters can be used in amounts up to about 1 weight percent based on the total weight of the monomers.

Other copolymerizable monomers are vinyl aromatic monomers, such as styrene, vinyl toluene, alpha methyl styrene and the like as well as nitriles and amides, e.g., acrylonitrile and acrylamide.

Additional copolymerizable monomers that can be used in this invention are the derivatives of the hypothetical vinyl alcohol, i.e., aliphatic vinyl esters such as vinyl formate, vinyl acetate vinyl propionate, vinyl butyrate, the vinyl ester of versatic acid and the like.

Any monomers which are copolymerizable with acetoacetoxyethyl acrylate, or methacrylate, glycidyl acrylate, or methacrylate and polymerizable acid can be used in this invention. Such monomers are those which contain no groups which are reactive under polymerization conditions with acetoacetoxy groups, glycidyl groups, or carboxylic acid groups.

The types and amounts of copolymerizable monomers used in this invention will vary depending on the particular end use for which the product of this invention is intended. Such variations are well known and can be readily determine by those skilled in the art.

Preferred comonomers for use in this invention are the acrylate and methacrylate esters wherein the ester group is an alkyl group containing 1 to 8 carbon atoms.

The compositions of this invention are prepared by polymerization of monomers emulsified in water using conventional emulsion polymerization procedures. Surfactants which are used for emulsification of the monomers are anionic and nonionic surfactants and mixtures of anionic and nonionic surfactants.

Examples of useful anionic surfactants are organosulfates and sulfonates, e.g., sodium and potassium alkyl, aryl and alkaryl sulfates and sulfonates, such as sodium 2-ethylhexyl sulfate, potassium 2-ethylhexyl sulfate, sodium nonyl sulfate, sodium lauryl sulfate, potassium methylbenzene sulfonate, potassium toluene sulfonate and sodium xylene sulfonate; higher fatty alcohols, e.g., stearyl, lauryl, etc., which have been ethoxylated and sulfonated; dialkyl esters of alkali metal sulfosuccinic acid salts, such as sodium diamyl sulfosuccinate, sodium dioxtyl sulfosuccinate, and sodium dioctyl sulfosuccinate; formaldehyde-naphthalene sulfonic acid condensation products; and alkali metal salts, partial alkali metal salts and free acids of complex organic phosphate esters.

Examples of nonionic surfactants which can be used in this invention are polyethers, e.g., ethylene oxide and propylene oxide condensates which include straight and branched chain alkyl and alkaryl polyethylene glycol and polypropylene glycol ethers and thioethers; alkylphenoxypoly(ethyleneoxy) ethanols having alkyl groups containing from about 7 to about 18 carbon atoms and having from about 4 to about 240 ethyleneoxy units, such as heptylphenoxy-poly(ethyleneoxy)ethanols, nonylphenoxypoly(ethyleneoxy)ethanols; the polyoxy-alkylene derivatives of hexitol (including sorbitans, sorbides mannitans and mannides; partial long chain fatty acid esters, such as the polyoxyalkylene derivatives of sorbitan monolaurate, sorbitan monopalmitate, sorbitan monostearate, sorbitan tristearate, sorbitan monooleate and sorbitan trioleate; the condensates of ethylene oxide with a hydrophobic base, said base being formed by condensing propylene oxide with propylene glycol; sulfur containing condensates, e.g., those prepared by condensing ethylene oxide with higher alkyl mercaptans, such as nonyl, dodecyl, or tetradecyl mercaptan, or with alkylthiophenols wherein the alkyl group contains from about 6 to about 15 carbon atoms; ethylene oxide derivatives of long chain carboxylic acids, such as lauric, myristic, palmitic, or oleic acids or mixtures of acids, such as tall oil fatty acids; and ethylene oxide derivatives of long chain alcohols such as octyl, decyl, lauryl, or cetyl alcohols.

The amounts of surfactants employed in the emulsion polymerization process will range from about 0.01 to about 10 weight percent, preferably about 0.2 to about 5 weight percent based on the total weight of monomers and water.

In addition to the surfactants, the emulsion polymerization system can also contain protective colloids. Examples of protective colloids are ether linkage-containing protective colloids, such as hydroxymethyl cellulose, hydroxyethyl cellulose, ethylhydroxyethyl cellulose, carboxymethyl cellulose, ethoxylated starch derivatives and the like. Other protective colloid substances can also be used either alone or together with the ether linkage containing materials. Other such protective colloids include partially and fully hydrolyzed polyvinyl alcohols, polyacrylic acid, sodium and other alkali metal polyacrylates, polyacrylamide, poly(methyl vinyl ether/maleic anhydride), polyvinylpyrrolidone, water soluble starch, glue, gelatin, water soluble alginates, such as sodium or potassium alginate, casein, agar and natural and synthetic gums, such as guar, gum arabic and gum tragacanth. The protective colloids can be used in the amounts ranging from about 0.1 weight percent to about 2 weight percent based on the total weight of the polymer emulsion.

The monomers used in this invention are polymerized by means of a catalytic amount of a conventional free radical polymerization catalyst or catalyst system (which can also be referred to as an addition polymerization catalyst, a vinyl polymerization catalyst, or a polymerization initiator), preferably, although not necessarily, one which is substantially water soluble. Among such catalyst are peroxides, such as hydrogen peroxide, tertiary butyl hydroperoxide, cumene hydroperoxide, alkali metal, (e.g., sodium, potassium or lithium) and ammonia persulfates, perphosphates, and perborates; azo nitriles, such as alpha, alpha-azobisisobutyronitrile, and redox system including such combinations as mixtures of hydrogen peroxide, t-butyl hydroperoxide or the like and any of the iron salts, titanous salts, zinc formaldehyde sulfoxylate, or sodium formaldehyde sulfoxylate; and alkali metal or ammonium persulfate, perborate or perchlorate together with an alkali metal bisulfite, such as sodium metabisulfite; and alkali metal persulfate together with an aryl phosphinic acid such as benzene phosphinic acid and the like.

The amount of polymerization catalyst employed will be no more than that required to obtain substantially complete monomer conversion at lower catalyst cost. The amount of catalyst will generally vary from about 0.1 to about 1 percent by weight based on the weight of the monomer.

The emulsification and polymerization reaction can be conducted by any of the well known procedures which are used to prepare emulsion polymers. For instance, the monomers, catalyst, surfactants, protective colloids if used, and chain transfer agents, e.g., alkyl mercaptans, if used, can all be added to the reactor, and the reaction with suitable agitation to obtain emulsification can be conducted at a temperature of about 30° C. to about 95° C. until the polymerization is complete.

Alternatively, the reaction can be conducted by adding water, surfactants, and protective colloids, if used, into the reactor, raising the temperature, to the reaction temperature and then adding the monomer and a solution of the catalyst to the reactor under agitation. Still another method is to pre-emulsify the monomers in a portion of the water and a portion of the surfactant along with catalyst, and to add the pre-emulsion to the reactor which contains the remaining water and surfactant.

In order to obtain compositions which form coatings having superior coating properties when cured under ambient conditions, the acetoacetoxy moiety, the glycidyl moiety and the acid moiety must be present in certain preferred ratios. It has been found that acetoacetoxy group and the glycidyl group must be present in the weight ratio of less than or equal to 0.5 or greater than 1.5, wherein the weight ratios are calculated based on the weight of acetoacetoxyethyl methacrylate and glycidyl methacrylate. The glycidyl group and the carboxylic acid group must be present in the weight ratio greater than 1.5 wherein the weight ratios are based on the weight of glycidyl methacrylate and acrylic acid. Furthermore, the total weight percent of the three monomers in the polymer is at least about 8 percent and not more than about 60 percent, said weight percents being based on the total weight of all monomers in the polymer.

The amount of water used to prepare the compositions of this invention will depend upon the solids content desired in the finished polymer emulsion. Generally the solids content will be at least 20 percent up to about 70 percent. Preferably the solids content will be about 40 percent to about 60 percent.

After the emulsion polymerization is complete, the pH of the emulsion is adjusted to about 8.5 to about 10 using a water soluble base. Suitable bases are alkali metal, ammonia and quaternary ammonium bases. Examples of suitable bases are ammonia, sodium hydroxide, potassium hydroxide, tetramethylammonium hydroxide, tetraethylammonium hydroxide, tetrabutylammonium hydroxide, benzyltrimethylammonium hydroxide and the like. A particularly preferred base is tetramethylammonium hydroxide.

The polymer emulsion compositions of this invention can be applied to a variety of substrates to form films and coatings which cure to thermostat compositions at ambient temperatures.

The following examples describe the invention in more detail. Parts and percentages are by weight unless otherwise indicated.

The extent of cure of the films in these examples was determined by testing for Gel Content and by calculating Swelling Index. These determinations were made on films which had been left under ambient conditions for at least 48 hours. The films were removed from the substrate and were tested as follows:

(1) duplicate samples of the films, approximately 2 gram samples, were weighed into glass bottles;

(2) toluene, 75 ml, was added to each bottle, the bottles were sealed and shaken vigorously;

(3) after 3 days, the bottle contents were decanted onto a weighed fine nylon mesh screen, and were thoroughly washed with toluene;

(4) the mesh screen was weighed, then dried in a vacuum oven and weighed; and (5) after determining the weight of wet gel and dry gel, the Gel Content and Swelling Index were determined as follows:

$$\% \text{ Gel Content} = \frac{\text{wt. of dry gel} \times 100}{\text{wt of film}}$$

$$\text{Swelling Index} = \frac{\text{wt wet gel} - \text{wet dry gel}}{\text{wt dry gel}}$$

Gel Contents of at least about 97 percent and Swelling Indexes of less than 3 indicate satisfactorily cured films.

Hot water resistance of the films was measured by immersing a weighed portion of dried polymer film in water at 80° C. for 10 minutes. The percent water absorbed and the weight loss of the film were determined. The films were examined for blushing since water absorption does not always correlate with blushing. Cold water resistance was determined on films left in room temperature water for 7 days.

EXAMPLE 1

To a suitable reactor fitted with two dropping funnels, condenser, agitator and thermometer were added 355 parts of water, 1.95 parts sodium bicarbonate and 9.83 parts of phosphated nonyl phenyl polyethylene glycol ether surfactant. To one dropping funnel were added 111.45 parts of methylmethacrylate, 128.57 parts of butyl acrylate, 10 parts of acetoacetoxyethyl methacrylate, 7.5 parts of acrylic acid and 22.5 parts of glycidyl methacrylate. To the other dropping funnel were added 40.43 parts of water and 1.13 parts of ammonium peroxy disulfate. Agitation was begun and heat was applied raising the temperature in the reactor to 85° C. An initial charge of 0.06 part of ammonium peroxydisulfate in 19.5 parts of water was made to the reactor and the slow addition of monomers and catalyst was begun. While keeping the temperature at 85° C., the monomers were added over 2 hours and the catalyst over 2 hours and 5 minutes. The temperature was lowered to 70° C. and 0.3 part of t-butylhydroperoxide was added. The temperature was then lowered to 35° C. and a solution of 0.3 part of sodium formaldehyde sulfoxylate in 9.89 parts of water was added. When the temperature reached 25° C., 4.89 parts of 28 percent ammonium hydroxide and 1.18 parts of a microbiostat were added. The resulting stable latex had a viscosity of 25 cps, a solids content of 40.45 percent and a pH of 5.2.

The pH of a portion of the latex was adjusted with ammonia to 7.5 and then with sodium hydroxide to 9.0. (Ex. 1A). Another portion had the pH adjusted to 9.0 with tetramethyl ammonium hydroxide (Ex 1B). Films were drawn down on glass panels and were left under ambient conditions for 48 hours. The films were removed from the substrate and tested with the results shown in Table 2.

EXAMPLE 2

Using the same procedure described in Example 1, 143.76 parts of methyl methacrylate, 165.79 parts of butyl acrylate, 9.03 parts of methacrylic acid, 14.45 parts of acetoacetoxyethyl methacrylate and 28.9 parts of glycidyl methacrylate were polymerized. The resulting latex had a viscosity of 1100 cps and a solids content of 47.32 percent. The pH of the latex was adjusted to 9.0 with tetramethyl ammonium hydroxide. Films were drawn down on glass panels and were left at ambient conditions for 48 hours. The film withstood 108 methyl ethyl ketone double rub. The results of other film tests are shown in Table 2.

EXAMPLE 3

Using the same procedure described in Example 1, 111.49 parts of methylmethacrylate, 128.57 parts butyl acrylate, 5.01 parts of acrylic acid, 7.42 parts of acetoacetoxyethyl methacrylate, and 10.2 parts of glycidyl methacrylate were polymerized. The resulting latex had a viscosity of 27.5 cps, a solids content of 40.74 percent and a pH of 7.45. The pH of the latex was adjusted to 7.5 with ammonia and to 9.0 with sodium hydroxide. Films made from the latex were tested after 48 hours under ambient conditions. The test results are shown in Table 2.

EXAMPLE 4

Using the same procedure described in Example 1, a latex was made by polymerizing 111.49 parts of methyl methacrylate, 128.57 parts of butyl acrylate, 5.02 parts of acrylic acid and 22.06 parts of acetoacetoxyethyl methacrylate. The latex had a viscosity of 22.5 cps, a solids content of 39.88% and a pH of 7.38. The pH of the latex was adjusted to 7.5 with ammonia and to 9.0 with sodium hydroxide. Films made from the latex were tested after 48 hours under ambient conditions. The test results are shown in Table 2.

EXAMPLE 5

Using the same procedure described in Example 1, a latex was made by polymerizing 142.13 parts of methyl methacrylate, 163.87 parts of butyl acrylate, 6.4 parts of acrylic acid and 19 parts of glycidyl methacrylate. The latex had a viscosity of 147.5 cps, a solids content of 45.74 percent and a pH of 7.4. The pH was adjusted to 9.0 with ammonia and sodium hydroxide. Films made from the latex and were tested after 48 hours under ambient conditions. The test results are shown in Table 2.

EXAMPLE 6

Using the same procedure described in Example 1, a latex was made using 145.8 parts of methyl methacrylate, 168.1 parts of butyl acrylate, and 9.83 parts of acrylic acid. The latex had a viscosity of 1650 cps and a solids content of 45.34 percent and a pH of 7.3. The pH of a portion of the latex was adjusted to 7.3 with ammonia. Another portion had the pH adjusted to 9.0 with tetramethylammonium hydroxide (TMAH). Films made from the latex were tested after 48 hours at ambient conditions. The film made from the portion containing TMAH withstood 38 methyl ethyl ketone double rubs. The test results are shown in Table 2.

EXAMPLE 7

Using the same procedure described in Example 1, a latex was made by polymerizing 153.11 parts of methyl methacrylate, 176.47 parts of butyl acrylate, 10.87 parts of acetoacetoxyethyl methacrylate and 21.73 parts of glycidyl methacrylate. The latex had a viscosity of 75 cps and a solids content of 39.88 percent. The pH of the latex was adjusted to 9.0 with tetramethylammonium hydroxide. Films made from the latex were tested after drying for 48 hours under ambient conditions. The test results are shown in Table 2.

EXAMPLE 8

Using the same procedure described in Example 1, a latex was made by polymerizing 120 parts of methyl methacrylate, 138.74 parts of butyl acrylate, and 8 parts of acrylic acid. The latex had a viscosity of 20 cps and a solids content of 40.38 percent. The pH was adjusted to 8.5 with tetramethylammonium hydroxide. Films made from the latex were tested after drying for 48 hours under ambient conditions. The test results are shown in Table 2.

EXAMPLE 9

Using the same procedure described in Example 1, a latex was made by polymerizing 39.04 parts of methyl methacrylate, 110.84 parts of butyl acrylate, 18.35 parts of methacrylic acid, 45.85 parts of acetoacetoxyethyl methacrylate and 91.76 parts of glycidyl methacrylate. The resulting latex had a viscosity of 15 cps at 40.96 percent solids. The pH was adjusted to 8.5 with tetramethylammonium hydroxide. Films made from the latex were tested after drying for 48 hours under ambient conditions. Test results are shown in Table 2.

TABLE 1

| | Monomer Content | | | |
|---|---|---|---|---|
| Ex. | AAEM % | GMA % | MAA/AA % | Other Monomer % |
| 1 | 3.5 | 8 | 2.5 | 86 |
| 2 | 4 | 8 | 2.5 | 85.5 |
| 3 | 3 | 4 | 2 | 91 |
| 4 | 8 | — | 2 | 90 |
| 5 | — | 6 | 2 | 92 |
| 6 | — | — | 3 | 97 |
| 7 | 3 | 6 | — | 91 |
| 8 | — | — | 3 | 97 |
| 9 | 15 | 30 | 6 | 49 |

AAEM — acetoacetoxyethyl methacrylate
GMA — glycidyl methacrylate
MAA — methacrylic acid
AA — acrylic acid

TABLE 2

| Ex. | Gel Content % | Swelling Index | Tensile psi | Elong % | Hot Water Abs % | Wt Loss % | Film Blush | Cold Water Abs % | Wt Loss % | Film Blush |
|---|---|---|---|---|---|---|---|---|---|---|
| 1A | 96.13 | 4.02 | 1149 | 182 | 29.08 | 2.51 | No | 13.87 | 2.54 | No |
| 1B | 96.34 | 2.98 | 1019 | 173 | 6.78 | 3.69 | No | 8.12 | 5.21 | No |
| 2 | 97.5 | 2.58 | 1581 | 123 | 8.91 | 0.92 | No | 8.92 | 1.99 | No |
| 3 | 95.09 | 6.61 | 814 | 277 | 13.99 | 0 | No | — | — | — |
| 4 | 91.2 | 8.39 | 940 | 265 | 25.44 | 0.53 | Yes | — | — | — |
| 5 | 92.31 | 8.2 | 1118 | 239 | 12.76 | 2.89 | No | — | — | — |
| 6* | 83.82 | 28.66 | 871 | 376 | 17.30 | 1.62 | Neg. | 90.0 | 2.7 | Yes |
| 6** | 79.75 | 30.56 | 384 | 475 | 89.98 | 9.11 | Yes | 124.87 | 5.06 | Yes |
| 6*** | 97.08 | 3.03 | 1333 | 143 | 20.31 | 0.49 | Yes | 7.0 | 1.5 | No |
| 7 | 88.28 | 8.47 | 783 | 317 | 14.64 | 0.9 | | 47.12 | 0.54 | |
| 8 | 79.75 | 30.56 | 384 | 475 | 89.98 | 9.11 | Yes | 124.87 | 5.06 | Yes |

TABLE 2-continued

| Ex. | Gel Content % | Swelling Index | Tensile psi | Elong % | Hot Water Abs % | Wt Loss % | Film Blush | Cold Water Abs % | Wt Loss % | Film Blush |
|---|---|---|---|---|---|---|---|---|---|---|
| 9 | 97.2 | 1.04 | 2200 | 5 | 1.79 | 4.73 | No | 1.95 | 6.19 | No |

*Example 6 neutralized with ammonia - pH 7.3
**Example 6 neutralized with TMAH - pH 9.0
***Example 6 blended with polyaziridine - (2% W/W - Xama 7 from Sanncor Industries.

Coatings made from the compositions of this invention are Examples 1, 2, and 9.

The principles, preferred embodiment and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A thermosetting coating composition comprising an aqueous dispersion of a copolymer of (a) acetoacetoxy ethyl acrylate or methacrylate, (b) glycidyl acrylate or methacrylate, (c) an ethylenically unsaturated polymerizable acid, and (d) a monomer copolymerizable therewith wherein (a) and (b) are present in the weight ratio of less than or equal to 0.5 or greater than 1.5, wherein (b) and (c) are present in the weight ratio of greater than 1.5, wherein the total weight percent of (a), (b) and (c) in the polymer is at least about 8 and not more than about 60 weight percent, wherein (d) is present in the amount of about 40 to about 92 weight percents and wherein the pH is about 8.5 to about 10.

2. The composition of claim 1 wherein the ethylenically unsaturated polymerizable acid is acrylic acid or methacrylic acid.

3. The composition of claim 1 wherein the monomer polymerizable therewith is an alkyl acrylate or alkyl methacrylate wherein the alkyl group contains 1 to 8 carbon atoms.

4. The composition of claim 3 wherein the monomers are methylmethacrylate and butyl acrylate.

5. The composition of claim 1 wherein the pH is adjusted with a water soluble base.

6. The composition of claim 5 wherein the base is ammonia.

7. The composition of claim 5 wherein the base is sodium hydroxide.

8. The composition of claim 5 wherein the base is a quaternary ammonium hydroxide.

9. The composition of claim 8 wherein the quaternary ammonium hydroxide is tetramethylammonium hydroxide.

* * * * *